United States Patent Office 2,870,979
Patented Jan. 27, 1959

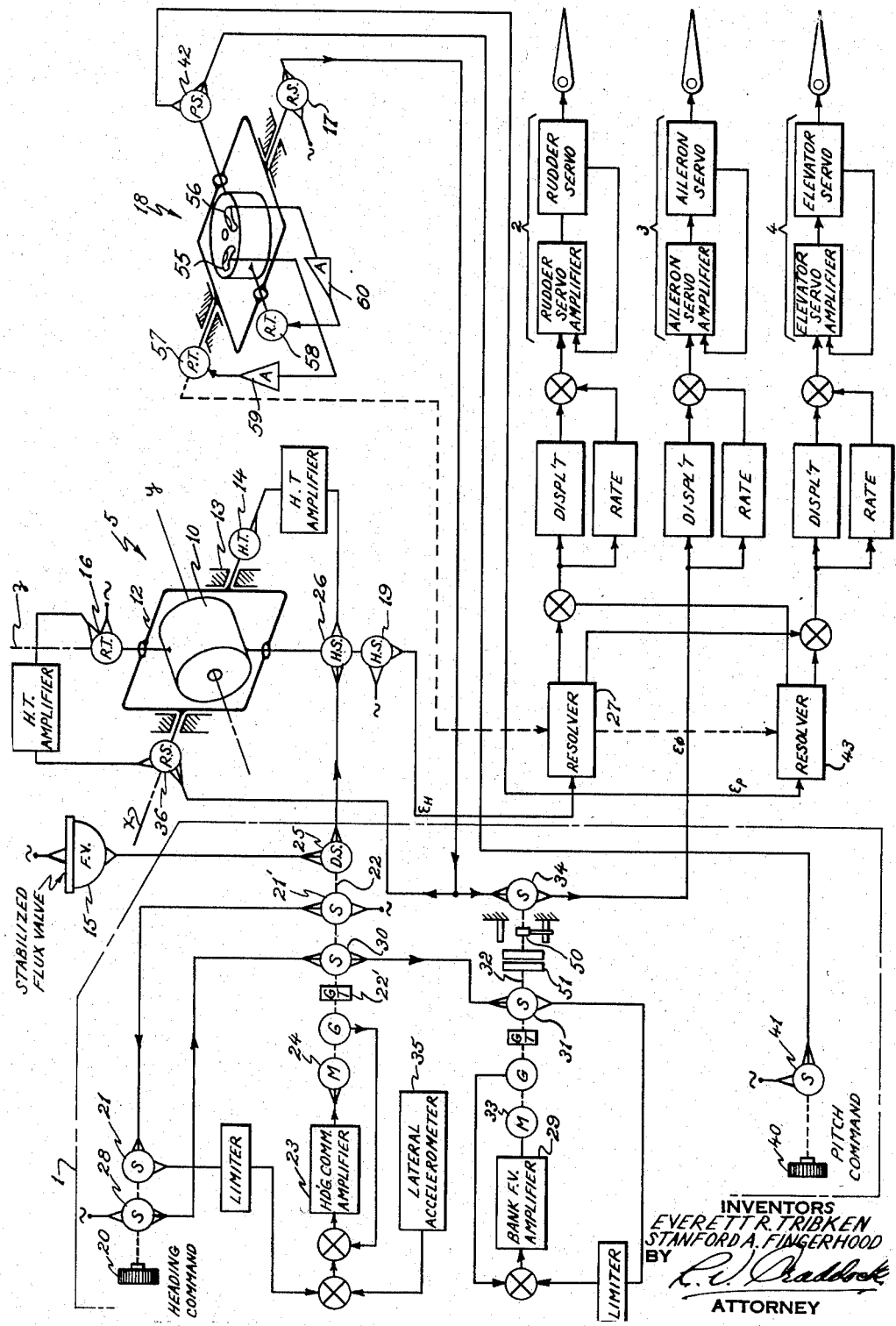

2,870,979

AIRCRAFT AUTOMATIC PILOT

Everett R. Tribken, Garden City, and Stanford A. Fingerhood, New York, N. Y., assignors to Sperry Rand Corporation, Great Neck, N. Y., a corporation of Delaware Application October 20, 1955, Serial No. 541,864

16 Claims. (Cl. 244—79)

The present invention relates generally to automatic pilots for aircraft and more particularly to an automatic pilot system wherein the maneuverability of the craft under continuous automatic control is unlimited about two craft axes and is likewise increased greatly about a third craft axis than that possible with many conventional automatic pilot systems.

Automatic pilots for aircraft fall into two general categories insofar as the stabilization references are concerned. One of these categories includes those automatic pilots wherein displacement type gyros are employed such as, for example, a directional gyro for providing a directional reference for the automatic pilot and a vertical gyro for providing pitch and roll reference for the automatic pilot. Both of these gyros are essentially long period devices deriving their long period control from earth base references such as the earth's magnetic field and gravity respectively. In such automatic pilots short period stabilization is derived by obtaining higher derivatives of the displacement signals produced by the long term references, i. e., the directional and vertical gyros. Another general automatic pilot category are those in which aircraft reference gyros, rate gyros, or director gyros are employed for short period stabilization. Autopilots employing the latter type devices or gyros may be termed rate-maneuvering systems, the maneuver commands thereto being in terms of rates of craft movement about the craft axes. In aircraft automatic pilots of the latter type, long period or displacement stabilization is derived through earth base references such as, for example, pendulums for pitch and roll references and the earth's magnetic field for yaw or directional reference.

The automatic pilot of the present invention includes the advantages derived from displacement-type gyros and also some of the advantages of the aircraft reference gyros, at least insofar as the directional reference is concerned. In automatic pilots using displacement type gyros which are slaved to earth based references, the main objection is that the craft maneuvers are restricted by the gimbal configuration of the gyro elements. Thus, automatic pilots of this type are generally applicable only to large aircraft of limited maneuverability, such as, bomber aircraft and commercial transport aircraft. However, an automatic pilot constructed in accordance with the teaching of the present invention is admirably adapted to fighter and interceptor type aircraft which are relatively highly maneuverable. The automatic pilot of the present invention will permit high maneuverability under complete automatic control through a novel gimbal configuration of the directional gyro; maneuvers of 360° in roll and up to ±80° maneuvers in pitch. This increase in craft maneuverability is obtained by supporting the gyro gimbal in the craft for freedom about an axis parallel to the craft fore and aft axis, and supporting the rotor case in the gimbal for freedom about a vertical axis normally parallel to the craft's vertical axis whereby the gyro spin axis is horizontal, and by providing means for maintaining the spin axis of the gyro at right angles to the plane of the gimbal, i. e., at an angle of substantially 90° from the fore and aft axis of the airplane. The latter is accomplished by the proper slaving of the gyro spin axis to a long term heading reference such as provided by a stabilized earth's magnetic field detection device. It will be understood, however, that any long term heading reference may be employed, such as, for example a three gyro stabilized platform and the like. Furthermore, with this gimbal configuration the inner gimbal angle, under zero pitch attitude conditions provides a measure of craft yaw angle which is not affected by craft roll attitude and by slaving the gimbal to a vertical gyro the inner gimbal angle, under most pitch maneuvers provides a measure of craft yaw angle error with respect to the earth's vertical, i. e. the inner gimbal angle is $\psi_e \cos \theta$, where $\psi_e$ is the yaw angle error of the craft in the earth coordinates system and $\theta$ is the craft pitch angle. A signal proportional to this measure is therefore correct for use in the craft rudder-elevator servos after resolution for roll angles only. It will be noted that with this gyro configuration, gimbal lock is avoided since the craft is controlled through the gyro to maintain its fore and aft axis always at right angles to the gyro spin axis.

The principal object of the present invention therefore is to provide gyroscopic control apparatus for aircraft wherein unlimited roll maneuver may be made under continuous control by said gyro apparatus.

Another object of the present invention resides in the provision of gyroscopic control apparatus for aircraft wherein the directional reference for the craft includes a free gyroscope having the spin axis thereof oriented at right angles to the fore and aft craft axis.

A further object of the present invention resides in the provision of a heading reference for aircraft automatic pilots wherein the gimballing of a directional gyro is such that the yaw measure provided thereby is unaffected by roll maneuvers of the aircraft.

Another object of the present invention resides in the provision of an autopilot system wherein the short term directional reference comprises a free gyroscope for providing a measure of the yaw attitude of the craft which is unaffected by roll maneuvers and by most pitch maneuvers, the gimbal configuration of the gyroscope being such that the inner gimbal angle measures yaw deviations while the outer gimbal angle is maintained vertical by means of a vertical gyroscope.

A further object of the present invention is to provide a heading reference for aircraft which comprises a directional gyroscope having a rotor bearing case for supporting the rotor so that it is spun about a horizontal axis and wherein the gimbal supports the rotor case for angular movement about a normally vertical axis, the gimbal itself being pivotally supported in the aircraft for angular movement about the craft's longitudinal axis or roll axis, and wherein means responsive to a heading reference device is provided for maintaining the craft's longitudinal axis substantially at right angles to the spin axis of the gyro and also wherein the gimbal ring is slaved to the vertical, i. e., the gyro spin axis is maintained horizontal through a vertical reference device such as a gyro vertical.

Other objects of the present invention not at this time more particularly enumerated will become apparent from the following detailed description of a preferred embodiment thereof illustrated schematically in the single figure of the accompanying drawing.

Referring now to the drawing, it will be observed that the automatic pilot of the present invention comprises generally a command control system represented by the reference character 1, a stabilization system comprising a vertical gyro 18 and a directional gyro 5 for stabilizing the aircraft about the roll and pitch axes and the yaw axis respectively. Furthermore, the automatic pilot comprises suitable servo systems 2, 3 and 4 for controlling respectively the aircraft rudders, ailerons and elevators in response to command signals from the command system 1 and stabilization signals from the vertical gyro 18 and the directional gyro 5.

In accordance with an object of the present invention the configuration of the directional gyro element 5 is such that gimbal errors due to craft roll attitude are eliminated. The directional gyro 5 comprises a rotor (not shown) mounted in a rotor bearing case or inner gimbal member 10 for spinning about a first horizontal axis $y$ normally parallel to the athwartship or pitch axis of the aircraft, i. e. when aircraft flies with wings level. Rotor case 10 in turn is provided with suitable trunnions for supporting the same in a gimbal ring 12 for pivotal movement therein about a vertical axis normally parallel to the craft vertical axis, i. e. when craft flies level. Gimbal ring 12 is pivotally supported on trunnions journalled in suitable bearings in the aircraft, schematically represented by reference character 13, for pivotal movement about a second axis $x$ parallel to the craft's fore and aft axis. Directional gyro 5 is further provided with a torque motor 14 having one part thereof fixed on the craft and the other part fixed on the outer gimbal ring trunnion for precessing the gyro about its $z$ axis. A second torque motor 16 having one part thereof fixed on gimbal 12 and the other part thereof fixed on the rotor case trunnion is provided for precessing the gyro about its $x$ axis. Suitable signal generators are also provided for supplying signals corresponding to the relative orientation of the gyro gimbals with respect to the craft. The signal generators used in the system are preferably of the selsyn type and may be referred to hereinafter as synchros. Signal generator 26, having one element fixed on the gimbal 12 and the other fixed on the rotor case trunnion, is provided for producing an output signal corresponding to the orientation of the rotor case 10 relative to the gimbal 12 about the gyro $z$ axis and likewise a similar signal generator 36 having an element thereof fixed on the craft and the other element thereof fixed to the gimbal trunnion is provided for producing a signal output corresponding to the orientation of the gimbal 12 about the aircraft longitudinal axis. A conventional power amplifier is provided between synchro 26 and torquer 14 for providing required power for the torquer. A similar amplifier is provided between synchro 36 and torquer 16.

Vertical gyro 18 is a conventional non-tumbling gyro and comprises a rotor supported in a rotor case for spinning about a normally vertical axis in a suitable horizontal gimbal ring which in turn is supported in the aircraft thereby to provide a universal support for the rotor case. The rotor case is slaved to gravitational vertical in a conventional manner as by means of suitable gravitationally responsive devices such as liquid levels 55 and 56 which actuate torque motors 57 and 58 on the roll and pitch axes, respectively of the gyro 18 through suitable torque motor amplifiers 59, 60 respectively. Vertical gyro 18 is provided with signal generators or pick-offs which are preferably of the selsyn type, pitch pick-off 42 providing a signal output corresponding to the pitch attitude of the craft and roll pick-off 17 for providing a signal corresponding to the roll attitude of the aircraft.

In accordance with the present invention, gimbal ring 12 of directional gyro 5 is maintained in a vertical plane with respect to the earth's coordinate system so that if the craft rolls while in a pitched attitude, the spin axis of the gyro will be maintained substantially horizontal and the yaw error signal will be unaffected by such roll maneuver. For this purpose, roll pick-off 17 is coupled with roll synchro 36 on gimbal axis 12 of directional gyro 5 and any difference in the orientation between the vertical gyro 18 and the position of gimbal 12 is therefore detected at 36. This difference is represented by an output signal from synchro 36 and is suitably amplified in the torque motor amplifier and applied to roll torquer 16 whereby to precess gimbal ring 12 until the difference signal from synchro 36 is zeroed. In this matter, the spin axis of directional gyro 5 is maintained horizontal and the heading error signal output therefrom is unaffected by roll attitude and most pitch attitudes say, plus or minus 80° pitch angles.

Not only is the spin axis of the directional gyro 5 continuously horizontal, but in accordance with another object of the present invention it is at all times substantially at right angles to the orientation of the craft's longitudinal axis. If the gyro should tend to drift, a slow or long period phenomena, it will be slaved back to its former position by the magnetic reference. However, if the craft deviates from a desired magnetic heading, a fast or short period phenomenon, it will be returned to its original heading as determined by the gyro orientation, through the craft servo systems. In either event the 90° relationship between the gyro spin axis and the craft fore and aft axis is continuously maintained. For this purpose, a magnetic reference device, such as a preferably stabilized flux valve 15, is provided for determining the orientation of the longitudinal axis of said craft with respect to the earth's magnetic field, i. e., with respect to the horizontal component of the magnetic north vector. Such a magnetic reference device is disclosed in more detail in U. S. Patent No. 2,539,411 which is assigned to the same assignee as the present invention and which may be stabilized, by means of a conventional data repeater system, to the vertical gyro 18. Synchro or control transformer 26 includes a polyphase or three-phase stator winding fixed to gimbal 12 and hence fixed with respect to the heading of the aircraft, the three-phase windings thereof being respectively connected with the three-phase windings of flux valve 15 through a polyphase differential synchro 25. The function of the latter synchro will be hereinafter more fully described. The resultant magnetic field produced by the three-phase winding of synchro transformer 26 depends upon the heading of the craft with respect to direction of the earth's magnetic field and the position or orientation of synchro 25. However, in accordance with the present invention, the polyphase winding or stator of signal transformer 26 is mounted on gyro gimbal 12 in such a manner that the windings thereof are exactly 90° displaced with respect to windings of flux valve 15. The single phase winding of synchro 26 is positioned in accordance with the orientation of the gyro rotor case 10, i. e., in accordance with the orientation of the gyro spin axis $y$. Since the polyphase winding of synchro 26 is fixed (90° displaced) relative to the angular position of the pickup coils of flux valve 15 in the earth's field, the signal generated in the single phase winding of synchro 26 is proportional to the changes in the heading of the craft. That is upon angular displacement of the flux valve legs relative to the earth's field and A. C. signal will be generated in one or the opposite phase in the single phase winding of synchro 26 depending upon the direction of such displacement. This signal is supplied to heading torquer amplifier nad heading torquer 14 to cause precession of the directional gyro spin axis $y$ to bring it into relative agreement with the directional reference provided by the flux valve 15. Since the three-phase winding of synchro 26 is 90° displaced from the reference direction defined by flux valve 15, the zero position of the single phase winding of the synchro is also 90° displaced from this reference direction and therefore the orientation of gyro spin axis $y$ which produces zero signal output from synchro 26 will also be substantially 90° displaced from the reference direction defined by flux valve 15. In this manner the gyro spin axis may be said to be slaved to the magnetic reference and long period drift of the gyro spin axis is eliminated.

A signal generator 19 which may be of the selsyn type is employed as a pick-off at the gyro 5 and includes relatively movable polyphase and single phase windings one of which is mounted to rotate with the craft in azimuth and the other of which is positioned by the rotor case 10. The output of the signal generator 19 is supplied to cross control resolver-multiplier 27 to control rudder servo system 2 and elevator servo system 4 in accordance with the magnitude of the bank angle of the aircraft. This roll resolution is provided for correcting for the cross-control action between yaw and pitch maneuvers of the aircraft at 90° bank angles, as more fully described in U. S. Patent No. 2,571,106, which patent is also assigned to the same assignee as the present invention. As was pointed out above, the gyro configuration of the present invention eliminates the requirement for pitch resolution since the output signal of synchro 26 is a measure of the gyro inner gimbal angle which angle is equal to craft heading error, with respect to earth axes, times the cosine of the pitch angle. This is the required signal for direct control of the rudder and no pitch resolver is needed as would be the case if the rudder signal were taken from an azimuth pick-off of a directional reference which is stabilized in pitch. Thus if the craft should deviate from its desired heading due to short term disturbances such as wind gusts or the like, the rudder will be deflected to cause the craft to be returned to its desired set heading. The stator windings of gyro output signal generator or synchro 19 are so positioned on gimbal 12 that the output signal in its rotor windings is zero when the spin axis $y$ of gyro 5 lies at an angle of 90° with respect to the craft's longitudinal axis.

The maneuver command control indicated by reference character 1 includes means for selecting a desired course or heading to be flown and also for selecting a desired pitch attitude to be maintained or stabilized by the automatic pilot of the present invention. The turn command system illustrated in the drawing is of the "heading" type, that is, one in which the pilot rotates command knob 20 to a desired aircraft heading and the aircraft turns until the new desired heading is achieved. Mounted on turn command knob 20 is a heading command signal generating means 21 which may be of the synchro type having a polyphase stator and a single phase rotor, the polyphase stator of which is excited from a heading follow-up synchro 21'. The three phase stator of synchro 21' is fixed relative to the craft, the single phase rotor of which is positioned by a heading follow-up motor 24 which drives heading follow-up shaft 22. Any difference between the position of motor shaft 22 and the setting of heading command knob 20 results in a signal being generated at the single phase stator of heading command synchro 21 which is applied to heading command follow-up amplifier and limiter 23, the output of which controls heading follow-up motor 24 and rotates the same through suitable gear train 22' until the error signal is reduced to zero. The heading error signal from heading command synchro 21 is limited before application to heading follow-up amplifier 23 so that no matter how large a heading command is selected or ordered, the maximum value that the signal may obtain cannot exceed a predetermined magnitude. In this manner, the speed with which heading follow-up motor 24 drives in response to the heading error signal is limited, this speed being proportional to a predetermined rate of turn of the craft as will be explained. In order to maintain motor speed accurately proportional to the magnitude of the input signal a speed feedback signal is employed in the conventional manner.

Also driven by heading follow-up motor 24 through shaft coupling 22 is flux valve differential signal transforming device such as differential synchro 25. This synchro may comprise a pair of three phase windings, one of which is fixed to the craft and the other of which is positioned by rotor shaft 22. One of the three phase windings of differential synchro 25 is connected to receive the output of flux valve 15 and the other output winding thereof is connected as an input to the heading slaving synchro 26.

Mounted on heading command knob 20 is a turn-bank command synchro 28 coupled with a bank differential synchro 30 mounted on heading follow-up motor shaft 22 for actuation by heading motor 24. The error between the shaft positions of the heading command synchro and the heading follow-up synchro is measured by the turn-bank command synchro 28 and the bank differential synchro 30. This error is detected by means of a bank follow-up synchro 31 on the output shaft 32 of a bank follow-up motor 33. The output of bank follow-up synchro 31 is supplied through a suitable limiter to bank follow-up amplifier 29 which energizes bank follow-up motor 33 to position the same in accordance with the difference between the shaft positions of heading follow-up motor 24 and heading command knob 20. In other words, the position of bank follow-up shaft 32 is proportional to the difference between the present heading of the aircraft and the desired heading thereof. Again, speed feedback is used in the bank follow-up servo loop for stabilizing the loop in accordance with conventional servo techniques. Mounted on bank follow-up motor shaft 32 is a bank command synchro 34 having a fixed three phase stator winding connected with the respective three phase windings of roll synchro 17 on vertical gyro 18, the single phase stator of the latter synchro being energized from a suitable source of alternating voltage. The single phase output winding of bank command synchro 34 is then proportional to the difference between the actual bank angle of the craft as measured by vertical gyro 18 and that commanded by the magnitude of the heading error. This output signal constitutes the bank command signal for the automatic pilot system and is accordingly applied to the aileron servo system 3 which positions the ailerons of the craft and causes the craft to bank until the actual bank angle of the craft as measured by gyro 18 corresponds to that commanded through bank follow-up loops 29, 33, 32. In order that the bank angle be prevented from exceeding a predetermined value, a limiting device, such as mechanical limiter 50 is mounted on the bank follow-up shaft 32, a suitable slip clutch 51 being provided for preventing damage to the bank follow-up motor 33.

Furthermore, in accordance with an object of the present invention the actual bank angle of the craft as measured by vertical gyro 18 is compared with the position of gimbal ring 12 of directional gyro 5 as by means of synchro 36 mounted on the gimbal trunnion. The output of synchro 36 is proportional to the difference between the bank angle of the craft and the orientation of gimbal 12, as will be produced by a combined pitching and rolling maneuver, this output being suitably amplified and applied to torquer 16 which accordingly applies a torque on the rotor case 10 to thereby precess gimbal 12 to maintain the latter vertical and hence to maintain the spin axis $y$ of gyro 5 substantially horizontal regardless of craft bank and pitch angle coupling effects on the gimbal system.

The aircraft is conventionally stabilized in pitch by means of vertical gyro 18 and pitch synchro 42 mounted thereon, any deviations in pitch attitude of the craft being detected thereby to provide a pitch error signal which is applied to elevator servo system 4 through resolver 43. A pitch command control is provided in the maneuver command control 1 and comprises a pitch command synchro 41 which operates to change the reference of the vertical gyro 18 in a conventional manner.

The operation of the automatic pilot of the present invention hereinabove described should be clearly evident from the foregoing description, but will briefly be outlined at this time. Assume first that the aircraft is cruising straight and level at some selected heading, say, a northerly heading. Under such conditions the output of heading follow-up amplifier 23 and motor 24 is zero and hence the follow-up shaft 22 is stationary, the position of which corresponds to the heading of the craft. A compass card (not shown) may be attached to this shaft if desired and may cooperate with a heading selector pointer actuated by command knob 20. Also, since there is no difference between the position of heading follow-up shaft 22 and the position of heading command knob 20, bank follow-up loop 29, 33, 32 is stationary and commands no bank angle. Since the selected or commanded heading is northerly, and since the resultant magnetic vector in the three phase winding of flux valve 15 always corresponds to magnetic north, this resultant magnetic vector is repeated unchanged or unmodified at the gyro slaving synchro 26. Should the gyro experience a long term drift, such drift would be detected at slaving synchro 26 resulting in a slaving signal being supplied to slaving or heading torquer 14 of directional gyro 5 to thereby precess the gyro into correspondence with the direction of the magnetic vector. However, as stated, the spin axis *y* of directional gyro 5 is so slaved to the magnetic reference or flux valve 15 that it is maintained 90 degrees displaced from the craft's longitudinal axis, the direction of which is determined by the orientation of flux valve 15 with respect to the magnetic field of the earth. The aircraft longitudinal axis is maintained or directionally stabilized for short period disturbances by directional gyro 5 through heading error pick-off 19 and rudder servo loop 2.

Assume now that it is desired to maneuver the craft to a new heading. The pilot rotates heading command knob 20 through an angle corresponding to the desired heading change, which may be indicated on a suitable heading selector dial (not shown), thereby producing an angular difference between the position of heading selector knob 20 and the position of heading follow-up shaft 22. Heading follow-up synchro 21' and heading command synchro 21 detect this difference and supply a signal to the input of heading command follow-up amplifier 23. Heading follow-up motor 24 responding to the output of amplifier 23 begins to rotate at a speed proportional to the magnitude of the limited input signal thereby rotating follow-up shaft 22 in a direction to reduce the difference between the positions of shaft 22 and heading selector knob 20 to zero.

Simultaneously, with the generation of the heading command signal at synchro 21 proportional to the difference between the positions of shaft 22 and command knob 20, a bank command signal, also proportional to the angular difference between the positions of these two shafts, is produced through synchros 28 and 30 and applied to bank follow-up synchro 31, the output of this latter synchro being supplied after suitable limiting to bank follow-up amplifier 29. Through the bank follow-up servo loop, the position of shaft 32 is proportional to the magnitude of the difference between the positions of heading follow-up shaft 22 and command knob 20, i. e., the heading error. The rotation of bank angle command synchro 34 produces a control signal to aileron servo channel 3 which actuates the ailerons of the craft to bank the same to an angle corresponding to the position of bank follow-up shaft 32 as measured by roll synchro 17 on vertical gyro 18. In other words, the craft will bank through an angle proportional within limits to the magnitude of heading error signal and thereby produce a rate of turn of the craft proportional, within limits, to the heading error.

As the craft banks, the inertial qualities of gyro 5 will maintain the gyro spin axis horizontal. However if the craft pitches while in a banked condition any precession of the gyro about the craft vertical axis will produce a signal at roll synchro 36 of directional gyro 5 which is amplified and applied to roll torquer 16 to cause precession of the spin axis of gyro 5 in a direction to reduce the error signal to zero. By this means the spin axis of gyro 5 is slaved to vertical gyro 18 during pitching maneuvers of the aircraft and hence the plane of the gimbal ring of gyro 5 is maintained vertical with respect to the earth. Thus, with this directional gyro configuration as compared with more conventional configurations gimbal lock and gimbal errors due to banking of the craft are eliminated.

At this point it should be noted that the response characteristics of the heading follow-up servo loop and the bank follow-up servo loop is slow as compared with the natural frequency of the aircraft in yaw and roll such that the aircraft responds in roll and yaw to the signals supplied thereby with complete faithfulness.

As the aircraft turns in azimuth in response to craft banking produced by the heading follow-up loop and bank follow-up loop, flux valve 15, being fixed to the craft in azimuth, will also turn relative to the earth's field. Since the magnetic vector defined by the output windings of the flux valve legs corresponds to a fixed direction in space, this magnetic vector, reproduced in the fixed field of differential flux valve synchro 25, will also rotate. If the turn is coordinated, the rate of rotation of the magnetic vector and the stator of differential flux valve of synchro 25 produced by flux valve 15 will rotate at the same rate that the heading follow-up shaft 22 rotates (and therefore the rotor of differential flux valve 25) and the gyro 5 will then be precessed at the same rate thereby producing no output to the rudder servo system 2. However, if the turn is uncoordinated, as during turn entrance and turn exit, or if skidding or slipping occurs during the turn, a coordination signal will be developed at lateral accelerometer 35 thereby to correct the rate of rotation of heading follow-up shaft 22 and hence speed up or slow down the movement of the rotor of differential flux valve synchro 25 with respect to the rate of rotation of the magnetic vector therein. The resulting difference in the rates of rotation of the rotor of synchro 25 and the magnetic field or vector in the stator thereof will cause a change in the precession rate of gyro 5 through gyro slaving synchro 26 and torquer 14 about the gyro vertical axis. Hence a rudder command signal will be generated at pick-off 19 to deflect the rudder to correct the craft rate of turn until the lateral accelerometer signal is zeroed. The craft will continue to turn so long as there is any difference between the positions of follow-up shaft 22 and the commanded position of heading command knob 20.

In this manner as the craft turns with zero pitch attitude about the vertical axis of the earth's coordinate system, the spin axis of gyro 5 will also be caused to turn about the gyro *z* axis and therefore the gyro spin axis will be maintained in a predetermined angular orientation with respect to the aircraft fore and aft or *x* axis, this predetermined orientation being substantially 90° displace therefrom, as described above. However, if the craft turns while in a pitched attitude, the slaving of the gimbal ring of gyro 5 to the vertical gyro 18 will remove the effects of precision of the gyro about the craft vertical axis.

As the new heading is approached, the relative position of shaft 22 and the selector knob 20 approach correspondence, thereby reducing the heading command signal from synchro 21. As stated, during the coordinated turn, the magnetic vector in the stator of differential flux valve synchro 25 is in substantial synchronism with the rotor thereof. However, as the new heading is approached, shaft 22 is slowed down resulting in a signal output from synchro 25 which will reduce the rate of precision of gryo 5 and a corresponding reduction in craft bank angle thereby reducing the turning rate of the craft. When there is no error between the heading command synchro 21 and heading follow-up synchro 21', the airplane has achieved its desired heading and the bank angle commanded will also be zero. The craft will then proceed on its new heading in straight and level flight.

It will be noted that with the automatic pilot configuration of the present invention, gust disturbances acting on the craft in yaw will have only a very small or secondary effect on the bank attitude of the craft because the heading follow-up loop has a slow response to these transient yaw disturbances.

Since many changes could be made in the above constrution and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A heading reference for aircraft comprising a magnetic device for determining the orientation of the longitudinal axis of said craft through interaction with the earth's magnetic field, a directional gyro having a rotor, a rotor case supporting said rotor for spinning about a horizontal spin axis, a gimbal for pivotally supporting said rotor case for movement about a second, normally vertical axis, means for supporting said gimbal in said aircraft for pivotal movement about a third normally horizontal axis parallel to the longitudinal axis of said aircraft, means responsive to said magnetic device for maintaining said spin axis at substantially right angles to the orientation of said craft longitudinal axis as determined by said magnetic device, means for determining the bank angle of said craft, and means coupled with said gimbal and responsive to said last-mentioned means for rotating said gimbal about said third axis in accordance with the roll angle of said craft whereby to maintain said rotor spin axis horizontal.

2. In an azimuth reference system for navigable craft the combination comprising a flux valve for supplying a signal upon changes in the azimuthal orientation of said craft relative to magnetic north, means responsive to said flux valve signal for supplying a first control signal corresponding to the difference between the existing azimuthal orientation and a desired azimuthal orientation of said craft relative to magnetic north, a directional gyroscope, means controlled by the orientation of said gyro and responsive to said first control signal for deriving a second control signal corresponding to the difference between the orientation of said gyro and the desired orientation of said craft as determined by said first difference signal, and means responsive to said second signal for precessing said gyroscope in azimuth in a direction and to an amount to reduce said second difference signal, both of said signals being zero when the orientation of said gyro corresponds to the desired azimuthal orientation of said craft.

3. An azimuth reference system for navigable craft comprising a flux valve for supplying a signal with changes in the azimuthal orientation of said craft relative to magnetic north, means responsive to said flux valve signal for supplying a first control signal corresponding to the difference between an existing and a desired azimuthal orientation of said craft relative to magnetic north, a directional gyroscope, means controlled by the orientation of said gyro and responsive to said control signal for deriving a second control signal corresponding to the difference between the orientation of said gyro and the desired orientation of said craft, means responsive to said second signal for precessing said gyroscope in azimuth in a direction and to an amount to reduce said second signal toward zero whereby to orientate said gyroscope in accordance with the desired azimuthal orientation of said craft, and means responsive to the azimuthal orientation of said gyroscope for supplying a craft control signal whereby to control said craft orientation in accordance with the orientation of said gyroscope to thereby reduce said first control signal to zero.

4. An azimuth reference system for an automatic pilot for aircraft having control surfaces and actuating means therefor for controlling the azimuthal orientation of said craft, said system comprising a flux valve for supplying a signal with changes in the azimuthal orientation of said craft relative to magnetic north, a directional gyroscope and means for precessing the same in azimuth, means for supplying an azimuth command signal proportional to a desired azimuthal orientation of said craft, means responsive to said flux valve signal and controlled by said command signal for supplying a first control signal proportional to the difference therebetween, means for supplying said first control signal to said gyro precessing means for precessing said gyro in azimuth whereby said gyro orientation is controlled in accordance with the desired orientation of said craft, means responsive to said gyro orientation for supplying a second control signal proportional to the difference between said gyro orientation and said craft orientation, and means for supplying said second control signal to said control surface actuating means whereby to control the azimuthal orientation of said craft in accordance with the orientation of said gyro to thereby reduce said first control signal toward zero.

5. In an automatic pilot for aircraft having control surfaces for controlling the azimuthal orientation of said craft and actuating means therefor, the combination comprising a flux valve for supplying a signal with changes in the azimuthal orientation of said craft relative to magnetic north, means for supplying an azimuth command signal proportional to a desired craft orientation, motive means responsive to said command signal and including means responsive to the operation thereof for reducing said command signal toward zero, means responsive to said flux valve signal and controlled by said motor means for supplying a first control signal proportional to the difference between present craft orientation and the desired orientation thereof, a directional gyro, means responsive to said first control signal and controlled by the orientation of said gyro for precessing said gyro in accordance with said first control signal, means responsive to the orientation of said craft relative to the orientation of said gyro for supplying a second control signal, and means for supplying said second control signal to said control surface actuating means whereby to control the orientation of said craft in accordance with the orientation of said gyro to thereby reduce said first control signal toward zero.

6. Automatic pilot means of the character set forth in claim 5 comprising further means responsive to turning of said craft for regulating the operation of said motor means.

7. A heading reference for aircraft comprising a magnetic reference device for supplying a signal which changes with the orientation of said craft in yaw relative to magnetic north, means responsive to said signal for supplying a first control signal corresponding to a desired heading of said craft relative to magnetic north, a directional gyroscope having a rotor, a rotor bearing case supporting said rotor for spinning about a first axis normally parallel to the pitch axis of said craft, a gimbal for pivotally supporting said rotor case for angular movement about a second axis normally parallel to said yaw axis of said craft, means for pivotally supporting the gimbal for angular movement about a third axis parallel to the craft roll axis, means responsive to said first control signal for precessing said spin axis about said second axis in a direction and to an amount to reduce said first control signal to zero whereby to orientate the spin axis of said gyro in accordance with the desired heading of said craft, a horizontal reference device for supplying a second control signal upon changes in the position of said craft about said roll axis relative to the horizon, and means responsive to said second control signal for precessing said spin axis about said third axis upon changes in the roll attitude of said craft whereby to maintain said spin axis horizontal.

8. An automatic pilot for aircraft having control surfaces for controlling the bank and yaw attitude of said aircraft, a magnetic reference device for providing a first signal proportional to the azimuthal orientation of said craft relative to magnetic north, a directional gyro having a rotor, a rotor-bearing case supporting said rotor for spinning about a horizontal axis, a gimbal pivotally supporting said rotor case for angular movement about a second normally vertical axis, means for supporting said gimbal in said aircraft for pivotal movement about a third axis parallel to the longitudinal axis of said aircraft, means for supplying a second signal proportional to a desired orientation of said aircraft, means responsive to said first signal and controlled by said second signal for providing a third signal proportional to the difference between an existing orientation of said craft and the desired orientation thereof, means for precessing said gyro about said second axis in accordance with said third signal, means responsive to the orientation of said gyro about said second axis for controlling said yaw control surface, further means responsive to said first signal for controlling said bank control surface whereby to cause said craft to bank and turn to thereby reduce said third signal, and means responsive to banking of said craft for precessing said gyro about said third axis in accordance with the craft bank angle whereby to maintain said gyro spin axis horizontal during turning of said craft.

9. An automatic pilot of the character set forth in claim 8 wherein said last-mentioned means comprises a vertical gyro having means for supplying a signal proportional to the bank angle of said craft and means coupled with said directional gyro and responsive to said bank angle signal for precessing the same about said third axis thereof in accordance with the blank angle of said craft.

10. Gyroscopic reference apparatus for aircraft comprising, a rotor, an inner gimbal supporting said rotor for spinning about a normally horizontal axis, an outer gimbal pivotally supporting said inner gimbal for angular movement about a second normally vertical axis, means pivotally supporting said outer gimbal in said craft for angular movement about a third axis parallel to the craft longitudinal axis whereby said spin axis is normally perpendicular to said second and third axes, means responsive to turning of said craft, precessing means controlled by said turn-responsive means for maintaining said spin axis perpendicular to said second and third axes, and precessing means for positioning said outer gimbal, a gyro vertical for providing a signal proportional to craft bank angle, and means for controlling said outer gimbal precessing means in accordance with said bank signal whereby to maintain the pivotal axis for said inner gimbal vertical.

11. In an automatic pilot for aircraft, in combination with means providing heading and bank references therefor, a heading command follow-up motive means having an output thereof connected to alter the reference provided by said heading reference means upon actuation thereof, a bank command follow-up motive means having an output thereof connected to alter the reference provided by said bank reference means upon actuation thereof, turn command means, means coupled between said turn command means and the output of said heading follow-up motive means for providing first and second signals each corresponding to the error therebetween, means supplying said first signal to said heading follow-up motive means in a sense to reduce the same towards zero and at a rate determined by the magnitude thereof, means coupled with the output of said bank follow-up motive means and responsive to said second signal for supplying a third signal corresponding to the error therebetween, and means for supplying said third signal to said bank follow-up motive means in a sense to reduce the same towards zero.

12. In an automatic pilot of the character set forth in claim 11 wherein said turn command means comprises a heading selector, wherein said first-mentioned error corresponds to an angle proportional to the difference between the existing craft heading and a selected heading thereof, and wherein the means for supplying said first signal to said heading follow-up motive means includes a limiter for limiting the magnitude of said first signal to a predetermined maximum value whereby to limit the rate of operation of said heading follow-up motive means to a predetermined value for all values of said first signal greater than said limited value.

13. In an automatic pilot for aircraft, of the character set forth in claim 11 further including means for supplying an additional signal proportional to lateral accelerations of said aircraft and means for further controlling said heading follow-up motive means in accordance therewith.

14. The combination in a gyroscopic reference apparatus for aircraft comprising, a gyro vertical having mutually perpendicular normally horizontal axes corresponding to the pitch and roll axes of the aircraft and pick-off devices providing signals respectively proportional to deviations of the aircraft from a level flight attitude condition about said pitch and roll axes, a three degree of freedom gyroscope having a rotor, a rotor case and a gimbal ring therefor, said gimbal ring being pivotally supported in said craft for freedom about an axis substantially parallel to one of the normally horizontal axes of said vertical gyro, and means responsive to the signal of one of said gyro vertical pick-off devices at one of said gyro vertical axes for stabilizing said gimbal ring with respect to said one gyro vertical axis.

15. The combination in a gyroscopic reference apparatus for aircraft comprising, a gyro vertical for defining a vertical reference axis having mutually perpendicular normally horizontal support axes corresponding to the pitch and roll axes of the aircraft and pick-off devices providing signals respectively proportional to deviations of the aircraft from a level flight attitude condition about said pitch and roll axes, a three degree of freedom gyroscope having a gimbal ring pivotally supported in said craft for freedom about an axis substantially parallel to one of the normally horizontal axes of said vertical gyro, a rotor case pivotally supported in said gimbal ring with freedom about an axis normally parallel to the reference axis established by said vertical gyro, means responsive to the signal of one of said gyro vertical pick-off devices for stabilizing said gimbal ring about an axis substantially parallel to one of said gyro vertical support axes, and means responsive to turning of said craft for maintaining said rotor case in a predetermined angular relation with respect to said gimbal ring.

16. A gyroscopic reference system for aircraft comprising, a vertical gyroscope for defining a vertical reference axis, signal generating means coupled with said gyroscope for providing a signal proportional to the bank angle of said craft, a three degree of freedom gyroscope having a gimbal ring pivotally supported in said craft with freedom about an axis substantially parallel to the roll axis of said craft, a rotor and rotor bearing case, said case being pivotally supported in said gimbal ring for freedom about an axis normally perpendicular to said gimbal support axis and said rotor being supported in said case such that its spin axis is normally mutually perpendicular to both said gimbal and rotor case support axes, means responsive to said signal generator for tilting said gimbal in accordance with the bank angle of said craft, and means responsive to turning of said craft for maintaining said spin axis substantially mutually perpendicular to said gimbal and rotor case support axes.

References Cited in the file of this patent
UNITED STATES PATENTS

| | | |
|---|---|---|
| 2,005,530 | Boykow | June 18, 1935 |
| 2,493,015 | Newton | Jan. 3, 1950 |